United States Patent
Süssner

[11] Patent Number: 5,665,475
[45] Date of Patent: Sep. 9, 1997

[54] EMBOSSING FOIL, IN PARTICULAR A HOT EMBOSSING FOIL, PREFERABLY FOR THE PRODUCTION OF MOTOR VEHICLE LICENCE PLATES

[75] Inventor: Hubert Süssner, Oberasbach, Germany

[73] Assignee: Leonhard Kurz GmbH & Co., Furth, Germany

[21] Appl. No.: 535,013
[22] PCT Filed: Mar. 14, 1994
[86] PCT No.: PCT/DE94/00287
  § 371 Date: Oct. 4, 1995
  § 102(e) Date: Oct. 4, 1995
[87] PCT Pub. No.: WO94/25295
  PCT Pub. Date: Nov. 10, 1994

[30] Foreign Application Priority Data

Apr. 24, 1993 [DE] Germany ............ 43 13 519.6

[51] Int. Cl.⁶ .................................. B41M 5/10
[52] U.S. Cl. ............ 428/488.4; 428/195; 428/204; 428/207; 428/411.1; 428/500; 428/522; 428/913; 428/914
[58] Field of Search ........................ 428/195, 204, 428/411.1, 913, 914, 207, 488.4, 522, 500

[56] References Cited

FOREIGN PATENT DOCUMENTS 0576942A  1/1994  European Pat. Off. .

Primary Examiner—William Krynski
Attorney, Agent, or Firm—Louis E. Marn

[57] ABSTRACT

There is disclosed an embossing foil, in particular, a hot embossing foil, preferably for the production of motor vehicle license plates wherein there is provided a decorative lacquer layer in at least a region-wise manner between a protective lacquer layer and at least one colored lacquer layer and wherein the decorative lacquer layer represents given graphic elements and comprises a lacquer containing pigments which luminesce upon being irradiated with light of a selected wavelength, preferably UV light and where the decorative lacquer layer or the transparent lacquer layer contain a material selected from the group consisting of a UV-absorber additive in an amount of from 0.5 to 2% by weight and a HALS-stabilizer in an amount of from 0.1 to 1.0% by weight.

5 Claims, 1 Drawing Sheet

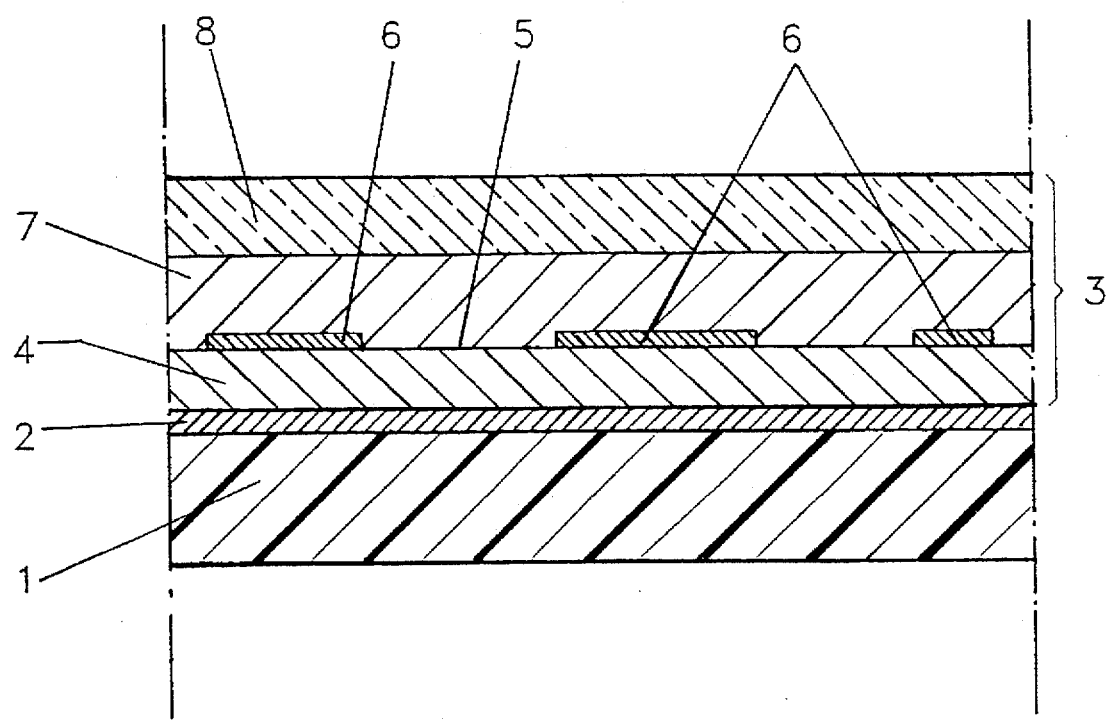

EMBOSSING FOIL, IN PARTICULAR A HOT EMBOSSING FOIL, PREFERABLY FOR THE PRODUCTION OF MOTOR VEHICLE LICENCE PLATES

BACKGROUND OF THE INVENTION

1. Field of the Invention

The invention concerns an embossing foil, in particular a hot embossing foil, preferably for the production of motor vehicle licence plates, comprising a carrier film and a transfer layer means which is detachable therefrom and which—starting from the carrier film—includes a transparent protective lacquer layer, at least one colored lacquer layer and an adhesive layer, which is possibly formed by the colored lacquer layer, for fixing the transfer layer means on a substrate to be decorated, for example the carrier plate of a motor vehicle licence plate.

2. Description of the Prior Art

It is known for motor vehicle licence or registration plates to be produced using hot embossing foils, wherein single-colored hot embossing foils are used to produce the background or undercoat lacquer layer or the lacquer layer which is different therefrom, for the characters on the licence plate, for example letters, figures, coats of arms, etc. Licence plates of that kind are distinguished over the hitherto conventional licence plates on the one hand by a high degree of durability and on the other hand by virtue of the fact that special safety measures during production can be avoided, because operation no longer involves liquid lacquers. The embossing foil wastes after the operation of embossing the licence plates can be disposed of without difficulty and in particular in a satisfactory and acceptable fashion.

Now, in particular having regard to the number of vehicle thefts which have increased greatly in recent times, and the forged licence plates which are used to a large extent in that respect, it would be desirable to provide an embossing foil which makes it possible to provide the licence plates with particular characters which make forgery difficult, while in addition the aim is to afford the option of establishing in a simple manner and by means of mechanical devices whether the licence plate is or is not a forged licence plate.

In DE-31 51 012, there is disclosed a method of identifying articles of value, for example, pictures, porcelain or articles of wood, in which a marking is applied to suitable locations on the surface, by means of dyes which are visible only when viewed under UV-radiation, employing an optical brightener and/or an almost colorless fluorescent dye. In the known method, the dyes are applied by hand and the marking must be additionally fixed with a cover layer of a cross-linkable polymer. That procedure is not possible, for example, in regard to the production of motor vehicle identifications because it would involve much too much cost. In addition, it is normally not possible for machine-readable graphic elements to be applied manually. A particularly serious disadvantage of the known method; however, is that it appears impossible for the cover layer to be applied for fixing the UV-visible marking to be applied so uniformly that any attempt at removal of the UV-readable marking can at any event be detected.

SUMMARY OF THE INVENTION

To attain that object, the invention now proposes that a hot embossing foil, as can preferably be used for the production of motor vehicle licence plates, is such that provided between the transparent protective lacquer layer and the at least one colored lacquer layer, at least in a region-wise manner, is a decorative lacquer layer which represents given graphic elements and which comprises a lacquer containing pigments which luminesce upon being irradiated with light of a selected wavelength.

The embossing foil according to the invention accordingly differs from the colored embossing foils used hitherto, as were also employed for example in the production of motor vehicle licence plates, in that an additional decorative lacquer layer, more specifically in the form of given graphic elements, is provided between the transparent protective lacquer layer and the actual colored lacquer layer, wherein the decorative lacquer layer is formed by a lacquer which contains pigments which luminesce only upon being irradiated with light of a selected wavelength.

In that way it can be provided that, when the article provided with the embossing foil, for example a licence plate, is lit in the usual way, it is not possible to detect whether now security elements are or are not present. It is only when the article is irradiated with light of the predetermined wavelength that the additional graphic elements become visible so that the authenticity of the licence plate etc can be established without problems, more specifically with a suitable choice and configuration of the graphic elements, certainly also by means of suitable items of equipment. The arrangement of the decorative lacquer layer between the transparent protective lacquer layer and the colored lacquer layer substantially prevents removal of or damage to the graphic elements of the decorative lacquer layer. It is at least however readily apparent if an attempt has been made to remove the graphic elements or the decorative lacquer layer because then the transparent protective lacquer layer is damaged, which however usually has the result that the surface of the colored lacquer layer is changed in a clearly perceptible fashion.

It is particularly desirable if the lacquer of the decorative lacquer layer contains pigments which luminesce upon being irradiated with UV-light because there is a large number of such pigments and in addition UV-light sources of a suitable design configuration are also already available. For example, when using UV-stimulatable pigments it is readily possible to check, in relation to a passing vehicle, more specifically also by machine, whether that vehicle is provided with an identification which is a proper identification, that is to say which has the corresponding graphic elements, or whether the vehicle bears a forged identification.

It has proven to be particularly desirable if, in the case of an embossing foil according to the invention, the protective lacquer layer and/or the decorative lacquer layer contains additives acting as a UV-absorber, in a proportion of from 0.5 to 2% by weight and/or HALS-stabilizers, in a proportion of from 0.1 to 1% by weight, wherein preferably the proportion of UV-absorber is about 1.5% by weight and the proportion of HALS-stabilizer is about 0.5% by weight.

If such additives are present in the protective or decorative lacquer layer, that ensures that the luminescent pigments in the decorative lacquer layer do not lose their luminescent properties, even when in use for a prolonged period of time. More specifically luminescent pigments are generally not UV-stable, for which reason under some circumstances, in relation to motor vehicle identifications which in fact are predominantly used in the open air or in daylight the pigments would possibly lose their luminescent properties after just a relatively short time, and this is prevented precisely by the UV-absorbers or HALS-stabilizers.

If, as the invention further provides, the colored pigments of the colored lacquer layer and the luminescent pigments of the decorative lacquer layer are adapted to each other in respect of color, that affords the advantage that, when lit with normal light, the presence of the specific graphic elements which luminesce only upon being irradiated with light of a given wavelength cannot be detected, whereby it is more difficult for an unauthorized person to check whether an identification produced with the embossing foil is genuine or false. In addition this configuration of the embossing foil permits the production of identification plates which do not differ in appearance from the hitherto conventional plates.

Finally, it is in accordance with the invention that the decorative lacquer layer is applied by a printing process because in that way the decorative lacquer layer can be applied in a particularly simple fashion but at the same time this affords a large number of possible configurations for the graphic elements.

BRIEF DESCRIPTION OF THE DRAWINGS

Further features, details and advantages of the invention will be apparent from the following description of a preferred embodiment of a hot embossing foil according to the invention, with reference to the drawing which diagramatically shows a view in section of a portion of a hot embossing foil.

It should be noted that the view in the accompanying drawing is not true to scale in regard to the layer thicknesses.

DETAILED DESCRIPTION OF THE INVENTION

The hot embossing foil of the illustrated embodiment includes a carrier film 1 on which a transfer layer generally identified by reference numeral 3 is arranged, with the interposition of a wax layer 2. The wax layer 2 serves to facilitate detachment of the transfer layer 3 from the carrier film 1 in use of the hot embossing foils. In the hot embossing step the transfer layer is pressed on to a substrate, under the action of pressure and heat. The heat melts the wax layer 2 whereby the transfer layer 3 is easily released from the carrier film 1.

Starting from the carrier film 1, the transfer layer 3 includes a transparent protective lacquer layer 4. A printing process is used to apply to the surface 5 of the protective lacquer layer 4, which is remote from the carrier film 1, a decorative lacquer layer 6 representing given graphic elements.

The decorative lacquer layer 6 is in turn covered over by a colored lacquer layer 7. The termination of the sequence of layers of the transfer layer 3 is formed by an adhesive layer 8, for example a hot sealing adhesive, in which respect, depending on the material of the substrate on which the transfer layer 3 is to be fixed, the heat-activatable adhesives which are generally known from the literature, based on thermoplastic acrylates, PVC-copolymers, polyesters or thermoplastic polyurethanes or mixtures of those bonding agents can be used for the adhesive layer 8.

The carrier film 1 is usually a polyester foil of a thickness of 19 to 23 μm. The wax layer 2 is of a thickness of less than 1 μm and comprises a wax which melts easily at the embossing temperature that is usually employed. Usually, depending on the field of use, the protective lacquer layer 4 is applied in a thickness of 1 to 10 μm, the greater layer thickness being intended for situations of use which involve a higher level of mechanical loading. The decorative lacquer layer 6 is of a thickness of about 0.5 to 2 μm. The color lacquer is of a thickness of 2 to 10 μm, again depending on the respective field of use. Finally the hot sealing adhesive layer is usually 0.5 to 5 μm in thickness.

The various lacquer layers may be for example of the following compositions:

| Protective lacquer layer 4 | |
| --- | --- |
| Methylethylketone | 40 parts |
| Toluene | 30 parts |
| Polymethylmethacrylate (MW: about 100,000, density: 1.18 g/cm) | 20 parts |
| Polyvinylidene fluoride (density about 1.7 g/cm) | 8 parts |
| UV-absorber (benzotriazole derivative, density 1.17 g/cm) | 1.5 parts |
| HALS-stabilizer (tetramethylpiperidine derivative) | 0.5 part |
| Decorative lacquer layer 6 | |
| Methylethylketone | 30 parts |
| Toluene | 25 parts |
| Polymethylmethacrylate (MW: about 100,000, density: 1.18 g/cm) | 30 parts |
| High-molecular dispersing additive | 2 parts |
| UV-absorber (benzotriazole derivative, density: 1.17 g/cm) | 1.5 parts |
| HALS-stabilizer (tetramethylpiperidine derivative) | 0.5 part |
| Inorganic or organic luminescent pigment | 10 parts |

For example zinc sulfides or zinc tungstates can be used as the inorganic luminescent pigments. Examples of organic luminescent pigments are benzoxazole derivatives and dihydroxynaphthaldazine derivatives. Corresponding luminescent pigments are marketed for example by the company Riedel de Haen AG in Seelze, under the designation 'Lumilux' (registered trade mark).

| Colored lacquer layer 7 | |
| --- | --- |
| Methylethylketone | 40 parts |
| Toluene | 20 parts |
| Polymethacrylate (MW: 60,000, density: 1.13 g/cm) | 15.5 parts |
| Acrylate polymer (40% in toluene, Tg = 50° C.) | 10.5 parts |
| Polyvinylidene fluoride (density about 1.7 g/cm) | 3 parts |
| High-molecular dispersing additive | 4 parts |
| Pigment Red 149 | 6 parts |
| Pigment Red 122 | 1 part |
| Hot sealing adhesive layer 8 | |
| Methylethylketone | 65 parts |
| Toluene | 17 parts |
| Linear thermoplastic polyurethane (density: 1.15 g/cm) | 8 parts |
| Unsaturated polyester resin (density: 1.23 g/cm, acid number 15) | 8 parts |
| Amorphous silicic acid (particle size about 10μ) | 2 parts |

The wax layer 2, the protective lacquer layer 4, the decorative lacquer 6, the colored lacquer layer 7 and the adhesive layer 8 are usually applied to the carrier film 1 by suitable printing processes. Those processes are generally familiar from the production of hot embossing foils so that they do not have to be described in greater detail here.

For the sake of completeness it should be pointed out that obviously the colored lacquer layer 7 does not necessarily have to be a unitary layer. On the contrary it would certainly be possible to provide a patterned layer as the colored lacquer layer 7, for example also a layer which has additional security elements which are visible at any time, in the form of coats of arms etc. Similarly, the protective lacquer layer 4 could also be of a graphic configuration by virtue of the use of different lacquers, in which respect in particular the protective lacquer layer 4 does not have to be colorless but may also be colored.

In use the hot embossing foil is applied with its adhesive layer 8 against the substrate to be decorated and then heat and pressure are applied from the carrier film side. When that happens the adhesive of the adhesive layer 8 is activated, whereby the transfer layer 3 adheres to the substrate. At the same time the wax layer 2 melts so that the carrier film 1 can be detached from the transfer layer 3 which remains on the substrate.

I claim:

1. A hot embossing foil for motor vehicle license plates, which comprises:

a carrier film; and a transfer layer detachable from said carrier film, said transfer layer comprising in seriatim, a transparent protective lacquer layer; a decorative lacquer layer disposed at least region-wise and representative of graphic elements and formed by a lacquer containing pigments which luminesce upon being irradiated by UV light; a colored lacquer layer and an adhesive layer for fixing said transfer layer to a substrate to be decorated, said decorative lacquer layer or said transparent protective lacquer layer containing a material selected from the group consisting of a UV-absorber additive in an amount of from 0.5 to 2% by weight and a HALS-stabilizer in an amount of from 0.1 to 1.0% by weight.

2. The hot embossing foil as defined in claim 1 wherein said UV-absorber additive is present in an amount of about 1.5% by weight.

3. The hot embossing foil as defined in claim 1 wherein said HALS-stabilizer is present in an amount of about 0.5% by weight.

4. The hot embossing foil as defined in claims 1, 2, or 3 wherein said colored lacquer layer further includes pigments of a color compatible with said pigments of said decorative lacquer layer.

5. The hot embossing foil as defined in claims 1, 2 or 3 wherein said decorative lacquer layer is applied by printing techniques to said transparent protective lacquer layer.

\* \* \* \* \*